Patented Feb. 14, 1928.

1,659,193

UNITED STATES PATENT OFFICE.

VIGGO DREWSEN, OF LARCHMONT, NEW YORK, ASSIGNOR TO WEST VIRGINIA PULP & PAPER COMPANY, OF NEW YORK, N. Y., A CORPORATION OF DELAWARE.

PROCESS FOR MAKING SODIUM MONOSULPHITE.

No Drawing. Application filed October 29, 1925. Serial No. 65,682.

The present invention relates to and provides a novel and economical process for the conversion of alkali sulphide, e. g., ($Na_2S$) into alkali monosulphite, e. g., ($Na_2SO_3$). The process is particularly adapted for use in the recovery of spent alkali sulphite liquors in the manufacture of paper pulp, but it may also be used in any other connection where such conversion is desired.

My process is based upon the following observations: Sodium sulphide ($Na_2S$) when exposed to air containing carbon dioxid tends to break down in time into sodium thiosulphate and sodium carbonate. But in the presence of carbonic acid free air it is gradually changed to sodium thiosulphates and caustic soda, according to the following equation:

I. $2Na_2S + 4O + H_2O = Na_2S_2O_3 + 2NaOH$

This reaction takes place rapidly, I have found, if the sodium sulphide be given great surface for treatment by mixing it in the presence of carbonic acid free air with porous solid materials such as charcoal, coke, pumice, stone powder, etc. Moreover, enlarging the surface by mixing the sodium sulphide in the presence of such air with crystalline or amorphous bodies, such as soda ash, sodium sulphite (anhydrous), clay, calcium carbonate, magnesium carbonate, also causes the reaction to take place rapidly. The reaction is exothermic and temperature tends to raise and the speed of reaction to accelerate. By keeping the temperature at 120° C. or lower, however, it is possible to control the reaction so that in a reasonable time the sulphide has disappeared and been converted into thiosulphate, according to above equations, as can be proved by testing the product. If the temperature of the mixture be then raised to about 140° C., another reaction occurs, whereby the sodium thiosulphate and caustic soda produced in the first step react to form sodium monosulphite and sodium sulphide, according to the following equation:

II. 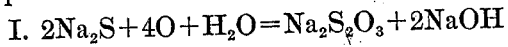 $3Na_2S_2O_3 + 6NaOH = 4Na_2SO_3 + 2Na_2S + 3H_2O$

It will be noted that two-thirds of the sodium is present as monosulphite and one-third as sulphide. By adding a small amount of water the sodium sulphide goes into solution, whereas the sodium sulphite remains insoluble in the solution of sodium sulphide and may be filtered off as anhydrous $Na_2SO_3$. By simple filtration I have recovered 93% of the theoretical amount of sodium sulphite, practically free from sodium sulphide.

The mother liquid of sodium sulphide may be concentrated by evaporation, and used again in the process of equation I.

However, with care, I have found that it is also possible at a temperature around 100° C. and with aeration in the presence of a surface giving material to transform the mixture of thiosulphate and caustic soda directly into monosulphite according to the following equation:

III. 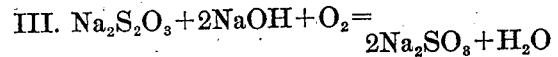 $Na_2S_2O_3 + 2NaOH + O_2 = 2Na_2SO_3 + H_2O$

In the practical use of my process, I have found it possible and convenient to carry on the reactions of equations I, II and III simultaneously, although if desired for special purposes they may be separated as above indicated, by properly controlling the temperature and aeration. Thus, in general, if a sodium sulphide be mixed with a surface giving body and agitated in the presence of carbonic acid free air while gently heated, the reaction sets in according to equation I and proceeds according to equations II and III until finally all the sodium sulphide is converted into sodium sulphite. Practically no sulphate is formed, especially if the temperature be controlled so as not to rise too high. The temperatures used may vary considerably, but in practice I have found that good results may be obtained by maintaining a temperature in the neighborhood of 140° C throughout the reaction.

As applied to the recovery of spent sodium sulphite liquors, the process may be conducted substantially as follows:

The liquor is first neutralized in the case of bisulphite spent liquors. In the case of monosulphite spent liquors, neutralization is not needed. The liquor is then concentrated and burned in a reducing flame. An intermediate step of drying for the recovery of by-products may be used if desired, or the organic matters may be burned directly. The heat generated by so burning the spent liquors is very great and can be economically employed to save fuel costs. The residue of the burning is mainly fused sodium sulphide (i. e., usually upwards of 50% $Na_2S$, the balance being chiefly sodium carbonate and other impurities which do not interfere with the further steps hereinafter described). This residue is continuously run from the furnace into a tank of water and agitated therein to form a hot solution of sodium sulphide. This may be as strong or stronger than the crystallized sodium sulphide of trade ($Na_2S,9H_2O$) which is liquid at about 50° C. and can be readily pumped at the temperatures employed in this process as hereinafter described.

The hot sodium sulphide solution (which may carry along the sodium carbonate and other impurities in the burned residue) is run into a closed mixing machine adapted for the mixing of powdery materials, of which many types are available on the market, (for instance the well-known Werner and Pfleiderer mixing machine). In the mixing machine, the fused sodium sulphide is brought into contact with a mass of powdered solid sodium monosulphide and subjected to a draft of air. The temperature of the mixing tank is maintained in the neighborhood of 140° C. The hot sodium sulphide solution is rapidly dried and solidifies as it comes in contact with the sodium monosulphide and the air blast under these conditions, the water escaping as steam. Then as the agitation and aeration of the mixture continues, a surface action is brought about whereby the air oxidizes the sulphide and eventually converts it into sodium monosulphite by means of the series of chemical reactions herein described. The process is advantageously conducted continuously, the hot solution being continuously pumped into the mixing machine and the treated product being allowed to overflow out of it. If a single mixing machine be used, the size of the mixing machine and volume of air supplied must be sufficient relative to the rate of delivery of the hot solution to permit of substantial completion of the reaction as the material passes through the machine. It is advantageous to use a series of mixing machines, the hot solution being continuously pumped into the first of the series and the partially treated solid powdered product overflowing into succeeding tanks of the series until the reaction is completed.

The presence of impurities, such as carbon, calcium carbonate, sodium carbonate, etc. in the orginal hot sodium sulphide solution does not interfere with the process, since such impurities merely help to promote the surface action and oxidation of the sodium sulphide. It is not even necessary to free the air for aeration in the process from carbon dioxide. Such air normally contains 4 liter $CO_2$ to 10,000 liter air. The amount is too small to do any harm to the reaction if the air supply is regulated.

If pure sodium monosulphite is desired, the crude monosulphite is dissolved in water and filtered or settled, and the clear solution concentrated. As the concentration proceeds, pure sodium monosulphite is precipitated as an anhydrous salt.

The crude sodium monosulphite resulting from the process dissolved in water with the insoluble impurities filtered or settled out is, however, suitable for use as a cooking liquor without special concentration and purification.

If bisulphite is desired, it is merely necessary to treat the monosulphite solution with sulfur dioxid gas till the bisulphite is produced.

The term "spent sodium (or alkali-metal) sulphite liquors" is used in the following claims to include spent liquors from any sodium or alkali monosulphite or bisulphite process.

It will be obvious from the foregoing that various modifications may be made in the details of the process described without departing from the spirit and scope of my invention.

What I claim is.

1. A process for converting sodium sulphide into sodium sulphite comprising agitating and aerating hydrous sodium sulphide in the presence of solid inert comminuted surface giving material.

2. A process for converting sodium sulphide into sodium sulphite comprising agitating and aerating hydrous sodium sulphide in the presence of solid anhydrous sodium sulphite.

3. A process for converting sodium sulphide into sodium sulphite comprising agitating and aerating hydrous sodium sulphide in the presence of solid comminuted surface giving material at temperatures of 120 to 160° C.

4. A process for converting sodium sulphide into sodium sulphite comprising agitating and aerating hydrous sodium sulphide in the presence of solid anhydrous sodium sulphite at temperatures of 120 to 160° C.

5. A process for the recovery of sodium sulphite from spent sodium sulphite liquors comprising recovering sodium sulphide from the spent liquor, running a fused aqueous solution of the sodium sulphide into a mixing tank containing solid comminuted sodium sulphite and agitating and aerating the mixture therein.

6. A process for the recovery of sodium sulphite from spent sodium sulphite liquors comprising recovering sodium sulphide from the spent liquor, running a fused aqueous solution of the sodium sulphide into a mixing tank containing solid comminuted sodium sulphite and agitating and aerating the mixture therein at temperatures of 120 to 160° C.

7. A process for the recovery of sodium sulphite from spent sodium sulphite liquors comprising recovering sodium sulphide from the spent liquor, running a fused aqueous solution of the sodium sulphide into a mixing tank containing solid comminuted surface giving material and agitating and aerating the mixture therein.

8. A process for the recovery of sodium sulphite from spent sodium sulphite liquors comprising recovering sodium sulphide from the spent liquor, running a fused aqueous solution of the sodium sulphide into a mixing tank containing solid comminuted surface giving material and agitating and aerating the mixture therein at temperatures around 140° C.

9. A process for converting alkali-metal sulphide into alkali-metal sulphite comprising agitating and aerating hydrous alkali sulphide in the presence of solid inert comminuted surface giving material.

10. A process for converting alkali-metal sulphide into alkali-metal sulphite comprising agitating and aerating hydrous alkali sulphide in the presence of solid comminuted surface giving material at temperatures of 120 to 160° C.

VIGGO DREWSEN.